United States Patent [19]

Scarano

[11] Patent Number: 4,598,238

[45] Date of Patent: Jul. 1, 1986

[54] ELECTRO-MECHANICAL SHOWER OSCILLATOR FOR PAPERMAKING MACHINE

[75] Inventor: Robert V. Scarano, Glens Falls, N.Y.

[73] Assignee: Albany International Corp., Menands, N.Y.

[21] Appl. No.: 726,631

[22] Filed: Apr. 24, 1985

[51] Int. Cl.[4] .............................................. H02P 1/22
[52] U.S. Cl. ................................... 318/282; 318/281; 74/424.8 R; 74/424.8 NA; 239/380
[58] Field of Search ................ 318/35, 280, 281, 282; 74/89, 89.15, 424.8 NA, 424.8 R, 424.5, 412 R; 134/167 R; 210/411; 239/227, 380; 415/132

[56] References Cited

U.S. PATENT DOCUMENTS

| | | | |
|---|---|---|---|
| 1,644,545 | 10/1927 | Robertson | 318/282 |
| 2,501,848 | 3/1950 | Johnson | 144/208 D |
| 2,754,227 | 7/1956 | Ransburg | 427/31 |
| 2,773,665 | 12/1956 | Berger et al. | 415/132 |
| 3,101,730 | 8/1963 | Harris et al. | 134/167 R |
| 3,112,263 | 11/1963 | Ellila | 210/411 |
| 3,150,534 | 9/1964 | Harrison | 74/424.8 R X |
| 3,271,598 | 9/1966 | Sturgeon | 310/29 |
| 3,289,944 | 12/1966 | Clark et al. | 239/227 |
| 3,379,379 | 4/1968 | Orem | 239/227 |
| 3,880,357 | 4/1975 | Baisch | 239/380 |
| 3,997,806 | 12/1976 | Noto et al. | 310/237 X |
| 4,199,999 | 4/1980 | Metz | 74/424.8 NA |
| 4,244,523 | 1/1981 | Looper | 239/227 |
| 4,335,342 | 6/1982 | Tholome | 318/282 |
| 4,359,674 | 11/1982 | Gotou | 318/341 X |

FOREIGN PATENT DOCUMENTS

| | | | |
|---|---|---|---|
| 0705027 | 3/1965 | Canada | 74/424.8 R |
| 55-90244 | 7/1980 | Japan | 74/424.8 R |
| 0814061 | 5/1959 | United Kingdom | 318/282 |
| 0699489 | 11/1979 | U.S.S.R. | 318/282 |
| 0799022 | 1/1981 | U.S.S.R. | 318/280 |

Primary Examiner—William R. Shoop, Jr.
Assistant Examiner—Bentsu Ro
Attorney, Agent, or Firm—Kane, Dalsimer, Kane, Sullivan & Kurucz

[57] ABSTRACT

An electro-mechanical oscillator has a DC motor with an output shaft coupled to a ball screw. A ball nut riding on the ball screw is coupled to an output sleeve which moves linearly with the ball nut. When the ball nut reaches one of two extreme positions its direction of movement is reversed by reversing the polarity of the voltage supplied to the motor. A control board is provided for monitoring the position of the ball nut, for reversing the motor and for controlling the speed of the motion.

14 Claims, 2 Drawing Figures

ELECTRO-MECHANICAL SHOWER OSCILLATOR FOR PAPERMAKING MACHINE

BACKGROUND OF THE INVENTION a. Field of Invention

This invention pertains to a shower oscillator for cleaning fabrics used in a papermaking machine and more particularly to a control motor for said shower oscillator.

b. Description of the Prior Art

Highly developed fabrics are used in the papermaking process in forming, pressing and drying. Studies have shown that a proper function of these fabrics requires that they be maintained in a clean condition. See for example the reference book entitled Pulp and Paper Manufacturer, Volume III, Second Edition, McGraw Hill Book Company, 1970, pages 376-385.

Several factors have contributed to a widespread recognition of the critical nature of the showering process in cleaning such fabrics. The increased use of recycled fiber has resulted in a high level of contamination of incoming furnish. This has resulted in an accelerated rate of fabric plugging. In addition, energy and environmental concerns have forced the substitution of dirty mill water for fresh water in many shower applications. Longer potential life of newer fabric designs has again placed great emphasis on more effective showering. Increased energy costs have produced financial pressures which emphasize the need for greater machine efficiency. Proper showering can significantly improve machine efficiency by allowing the higher operating speeds and extended fabric life achievable with cleaner machine clothing.

The accepted method of cleaning fabrics is showering. Originally, fabric cleaning showers were basically drilled pipes. They have developed, however, into sophisticated precision tools which are indispensable on the modern paper machine. Paper machine showers consist of a pipe which spans the fabric run and contains a plurality of nozzles. Cleaning showers are normally operated at relatively high pressure and are normally oscillated along the axis of the pipe in order to achieve eventual coverage of the entire fabric as it passes under the pipe.

Early oscillators, now essentially obsolete, used a crank arm or cam in order to produce an oscillating motion. Unsatisfactory variations in linear speed and a short operating life characterized these devices. Further developments included worm and pinion gearing as well as reversing the motor. This approach has been abandoned because of mechanical failure due to the high loads encountered in stroking large showers. Also, continuously reversing the conventional electrical motor can cause excessive heat rise and subsequent failure. More recently, hydraulic oscillators have been used. Hydraulic devices, however, require large quantities of fresh water, a significant amount of maintenance and do not lend themselves to the very low operating speeds now used.

However, recently it has been recognized that oscillation speeds much slower than those currently used will result in more effective cleaning. At the higher oscillation speeds commonly used, the jets produce a diamond shaped pattern in the clothing.

A recent commercial development is the diamond screw with ball followers, as described in U.S. Pat. No. 4,199,999. This method has been successful with smaller showers but not been able to handle the thrust loads encountered on the larger showers. The thrust load falls on a single ball follower and high point loads, resulting in early failure, are generated. Another undesirable feature of the diamond screw is the inability to adjust stroke length without disassembling the unit to add or exchange internal components.

Clearly, there is a need for an improved non-hydraulic paper machine shower oscillator featuring high reliability, slow speed capability and essentially instant turnaround.

OBJECTIVES AND SUMMARY OF THE INVENTION

With the above background in mind, it is an objective of the present invention to provide an electro-mechanical oscillator mechanism used to stroke a paper machine shower in the cross-machine direction.

It is a further objective of the present invention to provide a shower oscillator in which the stroke can be readily adjusted without adding or substituting internals.

The electro-mechanical oscillator of the present invention is capable of handling the largest showers in common use on papermaking machines. It is capable of reciprocating the heaviest showers with minimum wear. This feature is enhanced by the use of components such as a ball screw/ball nut in contact with the screw's thread.

It is another objective of the present invention to provide a means of adjusting the stroke length without adding or changing internals.

The present invention will allow the operator to select the traverse speed required for optimum cleaning performance. The speed will remain constant under widely varying load conditions.

It is yet another objective of the present invention to achieve dependability through simplicity. The present invention does not employ any clutches but is driven by a ball screw/ball nut assembly direct coupled to a pancake gear motor.

Paper machine shower oscillators are frequently located in very wet areas. It is an objective of the present invention to provide operator safety by using only low voltage to operate the oscillator motor.

It is an objective of the present invention to provide a means of oscillating shower pipes at the slower speeds which are now recognized to effect most efficient cleaning.

A further objective of the present invention is to eliminate fabric damage from any significant dwell at the turnaround points.

In summary an electro-mechanical oscillator is provided for reciprocating the shower heads of a papermaking machine to cause the cleaning sprays from the shower to traverse a zone. The oscillator comprises a DC motor coupled to a ball screw. A ball nut rides on the ball screw and is coupled to an output sleeve for moving reciprocally the shower heads. When the ball screw reaches two extreme positions, the polarity of the voltage supplied to the motor is reversed thereby reversing its direction of movement.

DETAILED DESCRIPTION OF THE INVENTION

Figure 1:
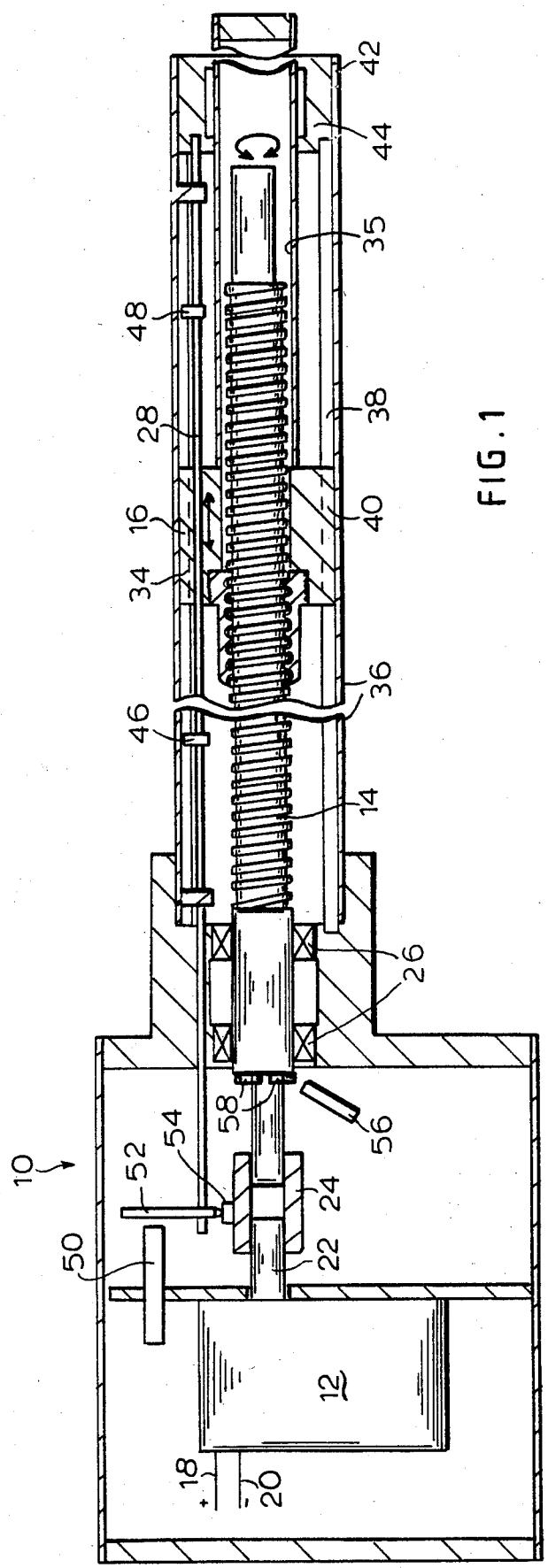
FIG. 1 shows an electro-mechanical oscillator constructed in accordance with the present invention.

Reference is now made to FIG. 1 showing an electromechanical oscillator having a housing 10 which contains a motor 12, a ball screw 14 and a ball nut 16 mounted on ball screw 14.

Motor 12 is preferably a DC motor which reverses its direction when the polarity of the voltage applied to it at leads 18 and 20 is reversed. An example of a suitable motor is a DC pancake gear motor as supplied by the Kollmorgen Corporation, PMI division. The motor operates at 12VDC/4 Amps and develops 3,000 RPM.

The output shaft 22 of the motor is coupled to the ball screw 14 by a standard coupling 24. Ball screw 14 is supported at one end by a ball bearing set 26. A rod 28 extends in parallel with ball screw 14 and is mounted by holes provided in the housing so that it can move in the direction of the ball screw axis.

A hollow shaft 35 is attached to ball nut 16 and is positioned so that it travels towards or away from motor 12 as the ball nut is moved along the ball screw in accordance with the direction of rotation of motor shaft 22.

A hole 34 is provided in the reciprocating shaft bearing and rod 28 extends through this hole. The hole 34 is dimensioned so that the ball nut 16 along with the reciprocating shaft bearing can move back and forth along ball screw 14 and rod 28 without any interference.

Housing 10 has an extension 36 which protects the ballscrew and the ballnut as shown. A key 38 extends along the bottom of extension 36. The reciprocating shaft bearing is also provided with a key hole 40 corresponding to key 38 as a means of insuring that the ball nut does not rotate during its reciprocating movement.

The extension 36 is also provided at its extreme end 42 with a cylindrical seal and bearing assembly 44 which permits shaft 35 to move in and out of the extension 36 in a reciprocating motion without contaminating the elements disposed within extension 36. Shaft 35 is connected either directly or indirectly (i.e. through a mechanical coupling) to one or more shower heads used in paper making.

Rod 28 is provided with two stop collars 46 and 48 affixed to said rod. These collars are larger than the diameter of hole 34. The motor is also provided with a SPST proximity switch 50 which is connected to a control circuit (described below). The control circuit activates the motor 12 either in the clockwise or the counterclockwise direction in accordance with the state of switch 50.

Rod 28 also has at its end closest to motor 12 a switch activating means 52. The switch activating means cooperates with switch 50 so that said switch is closed when means 52 is adjacent to the switch and opened when the means 52 is positioned away from the switch. For example, switch 50 may be an inductive proximity switch such as the one made by the MICROSWITCH, a division of Honeywell, Model No. 926AB2W-A9T. The switch actuating means 52 is then a metal target. This switch is able to sense a steel target at a distance of 2 mm.

The motor is further provided with a switch 54 and a rotation sensor switch 56. Switch 54 acts as a cut-off or overtravel switch. When switch actuating means 52 travels too far in either direction, switch 54 is allowed to open, cutting off power to motor 12. Switch 56 monitors the rotation of ball screw 14, and it is preferably an inductive proximity switch similar to switch 50 described above. Mounted on ball screw 14 there are provided a plurality of targets 58 constructed and arranged so that as the ball screw rotates each target sequentially is moved into and out of the range of switch 56 activating and deactivating the same. For example, if four targets 58 are provided, switch 56 is opened and closed four times for each rotation of ball screw 14.

When the motor 12 is initially activated and the rod 28 and switch activating means 52 are positioned so that the means 56 is disposed adjacent to switch 50 thereby causing the motor to turn in a first direction, such as clockwise, it starts rotating the ball screw. The rotational motion of ball screw 14 is transformed into a linear motion by ball nut 16, which may move for example, away from motor 12. The ball nut moves away from motor 12 until it eventually engages collar 48, and pushes rod 28 in parallel with the ball screw axis away from the motor. As a result, means 52 is shifted away from switch 50 causing the switch to change state. In turn switch 50 causes the voltage applied to motor 12 to be reversed, thus reversing the direction of rotation of ball screw 14 and the linear motion of ball nut 16. The ball nut 16 starts moving linearly towards motor 12 until it engages stop collar 46 thus pushing means 52 toward switch 50 and reversing the whole process. The linear reciprocal motion of the ball nut is transmitted to shaft 35 and to the shower head. The stroke of the shaft and the amplitude of its oscillation is controlled by the positions of the stop collars 46 and 48.

If the ball nut moves too close to motor 12 the power to the motor is cut off by switch 54. If the ball screw stops rotating for more than a predetermined period of time, as determined by sensor switch 56, an alarm indicator means is activated as described more fully below.

Figure 2:
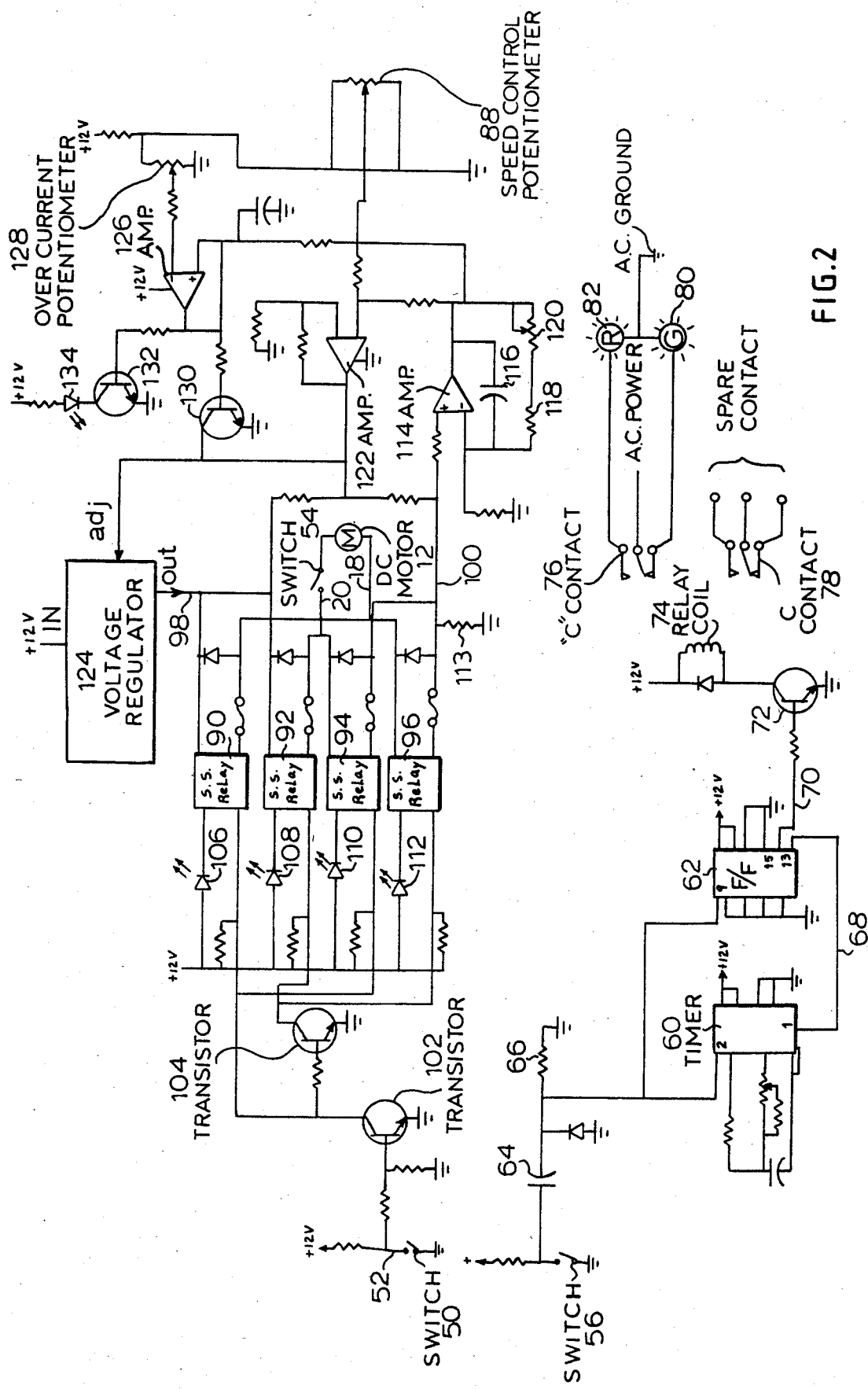
FIG. 2 shows a control circuit for operating the oscillator of FIG. 1.

Details of the control circuit for operating motor 12 are shown in FIG. 2. The control circuit comprises a timer 60, which may be a CMOS type integrated circuit such as MC14521BCL also manufactured by MOTOROLA, and a flip-flop 62 which may be a CMOS type integrated circuit such as MC14027BCL also manufactured by MOTOROLA. As switch 56 opens and closes under the influence of targets 58 as described above, it generates pulses. After wave shaping by capacitor 64 and resistor 66, these pulses are used to reset timer 60 and flip-flop 62. Immediately after it is reset, timer 60 starts to time out. The output 68 line of timer 60 is initially low. Flip-flop 62 has an output line 70 used to drive transistor 72 as shown. While flip-flop 62 is in a RESET state, its output line 70 is high and transistor 72 is turned on. Transistor 72 is coupled through its collector to a relay coil 74, which is energized when the transistor 72 is ON. Relay coil 74 is used to activate two "C" contacts 76 and 78. Contact 76 is used to drive two indicating lights 80 and 82, which are preferably green and red, respectively. When the coil 74 is energized, contact 76 energizes green light 80. Contact 78 is a spare contact.

Normally, as the screw nut 14 rotates, switch 56 keeps generating pulses which keep resetting timer 60. For example, four pulses may be generated for each rotation of the screw nut if the screw nut is provided with four targets. However, if the screw nut comes to halt for any reason, the absence of a reset pulse to timer 60 for a preset duration of time (for example 32 seconds), will allow timer 60 to time out. Once the timer 60 times out, it generates a high voltage on its output line 68 which changes the output of flip-flop 62. As a result, flip-flop 62 turns transistor 72 off, thereby de-energizing relay coil 74. When coil 74 is de-energized, contact 76 energizes red light 82. When the ball screw starts turning again, the pulses from the switch 56 reset timer 60 and flip-flop 62 to their initial state. Importantly, if the power supply to the control circuit fails, the relay coil is similarly de-energized, so that in effect, lights 80 and 82 indicate not only the rotation of the screw nut but also the status of the control board and its power supply.

The spare contact 78 may be used for various purposes. For example, it may be used to control the pump which supplies the water to the oscillating shower head of FIG. 1. If the shower head stops oscillating, contact 78 stops the water pump thereby preventing the water ejected from the head from damaging the web being washed.

The control circuit for the motor, shown in FIG. 2 comprises four solid state relays (SSR) 90, 92, 94 and 96. The four SSR's are connected in a bridge configuration and are adapted to provide power to the motor leads 18 and 20 from power buses 98 and 100. The four SSR's are controlled by two cascaded transistors 102 and 104. These transistors are standard transistors such as 2N2222A. The base of transistor 102 is connected via switch lead 53 to switch 50. Bus 98 is the positive bus while bus 100 is the negative bus. The voltage across buses 98 and 100 is varied by a speed control potentiometer 88.

When switch 50 is closed the base of transistor 102 is grounded turning transistor 102 OFF. When transistor 102 is OFF, SSR's 90 and 94 are also OFF and transistor 104 is ON. Transistor 104 energizes SSR's 92 and 96. In turn SSR 92 connects positive bus 98 to motor lead 18 and SSR 96 connects negative bus 100 to motor lead 20.

When switch 50 is open the base of transistor 102 is raised to about +12VDC turning the transistor ON. As a result, SSR 90 and 94 are activated. At the same time transistor 104 is turned OFF deactivating SSR's 92 and 96. SSR 90 connects motor lead 20 to positive bus 98 while SSR 96 connects motor lead 18 to negative bus 100. Thus the four SSR's in conjunction switch 50 and transistors 102 and 104 effectively reverse the voltage on motor leads 18 and 20. The operation of the individual SSR's is monitored by LED's 106, 108, 110 and 112, respectively, as shown in FIG. 2.

Inherently, if the voltage across buses 98 and 100 is maintained constant, the speed of the motor is load-dependent. In order to operate the motor 12 at a constant speed, the motor current is monitored through a resistor 113 connected between bus 100 and ground. The voltage across resistor 113 is fed to the non-inverting input of an amplifier 114. The output of the amplifier 114 is fed back to the inverting input of the amplifier through a low pass filter formed by capacitor 116 and resistors 118 and 120. The voltage from speed control potentiometer 88 is summed to the output of amplifier 114 by a summing amplifier 122. The output of the summing amplifier 122 is used as an input signal to a voltage regulator 124 which generates a regulated output used as a voltage source by bus 98. Thus, the output of the regulator 124 is varied as required to maintain the speed of motor 12 constant as set by potentiometer 88 independent of the load.

The motor current as represented by the output of amplifier 114 is also fed to a third amplifier 126. Amplifier 126 compares the value of the motor current to a threshold value which is set by overcurrent potentiometer 128 as shown. When the voltage at the non-inverting input to amplifier 126 (i.e. the output of amplifier 114) exceeds the threshold voltage at the inverting input of amplifier 126, the output of amplifier 126 goes high turning transistors 130 and 132 ON, indicating that the motor current has exceeded the threshold preset by potentiometer 128. Transistor 130 effectively grounds bus 98, causing the motor to stop. Transistor 132 activates LED 134 indicating an overcurrent condition. After motor 12 stops, timer 60 times out turning relay 74 off as described above.

Clearly, numerous modifications may be made to the invention without departing from its scope as defined in the appended claims.

What is claimed is:

1. An electro-mechanical oscillator for reciprocal movement of at least one shower head, comprising:
   a DC pancake gear motor having input leads for applying voltage to the motor and an output shaft which rotates in one of two directions in accordance with the polarity of said voltage;
   a first member comprising a ball screw coupled to said output shaft;
   a second member comprising a ball nut means mounted on said first member for moving said second member linearly in accordance with rotation of said output shaft;
   a shower head operating shaft coupled to said second member; and
   reversing means for reversing the polarity of said voltage and accordingly reversing said DC pancake gear motor when said second member reaches predetermined positions so as to reverse the movement of the shower head in a somewhat instantaneous manner to prevent undesired dwell time of said shower head during reversal.

2. The oscillator of claim 1 wherein said reversing means comprises a rod extending and movable in parallel with said ball screw, means for moving said rod when said ball nut reaches said predetermined positions and a sensor switch for determining the position of said rod.

3. An electro-mechanical oscillator for reciprocal movement of at least one shower head, comprising:
   a housing with an extension;
   a DC pancake gear motor having input leads for applying voltage to said motor, and output shaft, the voltage polarity on said leads determining the direction of rotation of said output shaft;
   a ball screw disposed in said extension;
   a sleeve for coupling said ball screw to said output shaft;
   a ball nut mounted on and engaging said ball screw which moves in one of two axial directions depending on the direction of rotation of said ball screw;
   a rod affixed to said extension by means which allow said rod to move reciprocally in parallel with said ball screw, and having means for moving said rod in a first direction when said ball nut reaches a first position, and in a second direction when said ball nut reaches a second position; and
   means for reversing the polarity of said voltage and accordingly reversing said DC pancake motor when said ball nut reaches said first and second positions by sensing the position of said rod so as to reverse the movement of the shower head in a somewhat instantaneous manner to prevent undesired dwell time of said shower head during reversal.

4. The oscillator of claim 3 further comprising an output sleeve coupled to the screw nut said output sleeve being at least partially hollow and said ball screw extending into said output sleeve.

5. The oscillator of claim 4 wherein said rod has two stops which are positioned to engage said ball nut when said ball is in said first and second position respectively.

6. The oscillator of claim 4 further comprising means for controlling the speed of the motor and the ball nut by varying said voltage.

7. The oscillator of claim 6 further comprising means for monitoring the movement of said ball screw.

8. An electro-mechanical oscillator comprising:
a housing with an extension;
a DC motor having input leads for applying voltage to said motor, and output shaft, the voltage polarity on said leads determining the direction of rotation of said output shaft;
a ball screw disposed in said extension;
a sleeve for coupling said ball screw to said output shaft;
a ball nut mounted on and engaging said ball screw which moves in one of two axial directions depending on the direction of rotation of said ball screw;
a rod affixed to said extension by means which allow said rod to move reciprocally in parallel with said ball screw, and having means for moving said rod in a first direction when said ball nut reaches a first position, and in a second direction when said ball nut reaches a second position;
means for reversing the polarity of said voltage when said ball nut reaches said first and second positions by sensing the position of said rod;
output sleeve coupled to the ball nut, said output sleeve being at least partially hollow and said ball screw extending into said output sleeve;
means for controlling the speed of the motor and the ball nut by varying said voltage;
means for monitoring the movement of said ball screw; and
relay and relay control means for controlling said relay in accordance with the movement of said ball screw.

9. The apparatus of claim 8 further comprising voltage control means for controlling the voltage across said motor to control the motor speed.

10. The apparatus of claim 9 further comprising circuit monitoring means for monitoring the motor current.

11. The apparatus of claim 1, wherein said voltage means includes means for varying the motor voltage in accordance with said motor current to operate said motor at a preselected speed.

12. The apparatus of claim 11 further comprising overcurrent means for comparing the motor current to a threshold value.

13. The apparatus of claim 12 further comprising means for stopping said motor when said overcurrent means detects that said motor current exceeds said threshold value.

14. The apparatus of claim 8 further comprising motor status indicating means coupled to said relay means.

* * * * *